UNITED STATES PATENT OFFICE.

ERNST GOEBEL, OF ELBERFELD, GERMANY, ASSIGNOR TO THE FARBEN-FABRIKEN OF ELBERFELD COMPANY, OF NEW YORK.

OLIVE COTTON-DYE AND PROCESS OF MAKING SAME.

SPECIFICATION forming part of Letters Patent No. 653,670, dated July 17, 1900.

Application filed October 31, 1899. Serial No. 735,409. (Specimens.)

*To all whom it may concern:*

Be it known that I, ERNST GOEBEL, doctor of philosophy, chemist, residing at Elberfeld, Germany, (assignor to the FARBENFABRIKEN OF ELBERFELD COMPANY, of New York,) have invented a new and useful Improvement in Olive Cotton-Dye; and I hereby declare the following to be a clear and exact description of my invention.

I have found that valuable coloring-matters dyeing unmordanted cotton from greenish-olive to olive and brownish-olive shades are obtained if certain methylized derivatives of amidodinitrodiphenylamin having the formula

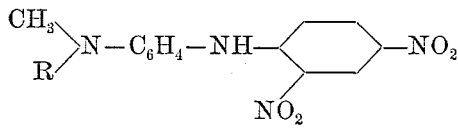

(R meaning a hydrogen atom which may be replaced by a methylic group) are subjected at elevated temperatures to the action of alkaline sulfid-carrying compounds, such as mixtures of sodium or potassium sulfid and sulfur, sulfur and soda, sulfur and potassa, sodium polysulfid, potassium polysulfid, or the like. The dyestuffs thus obtained are dark powders, which are soluble in water by a ten-per-cent. ammonia liquor. They are dissolved with an olive color. As above mentioned, they dye unmordanted cotton in hot baths containing sodium sulfid and common salt from greenish-olive to olive and brownish-olive shades.

It may be remarked that the bodies which are used as bases or starting materials in the present process can be easily produced by the action of 1 3 4 dinitrochlorobenzene on monomethylized or unsymmetrically-dimethylized diamins of the general formula

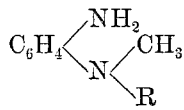

(R meaning in this formula a hydrogen atom which may be replaced by a methylic group,) such as paraämidomonomethylanilin, paraämidodimethylanilin, metaämidodimethylanilin, orthoamidodimethylanilin, or the like.

In order to illustrate my new process more fully, the following example is given, the parts being by weight: To a mixture prepared from eighty parts of dry sodium sulfid, sixty parts of sulfur, and thirty parts of water, which mixture is heated in an iron vessel provided with a stirring apparatus, forty parts of dimethylamidodinitrodiphenylamin having the formula

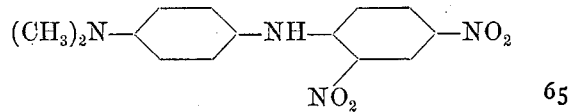

(which can be obtained by the action of 1 3 4 dinitrochlorobenzene on paraämidodimethylanilin, (see *Berichte der Deutschen Chemischen Gesellschaft*, Vol. XXIII, p. 2739) are added with stirring at about from 90° to 100° centigrade. The temperature is then slowly raised to about from 150° to 160° centigrade, the mass being stirred the while. When the whole mass becomes solid, the iron vessel is closed and the temperature of the mixture is by and by raised to from 280° to 290° centigrade. The melt is kept at this temperature until the quantity of the dyestuff formed during the reaction no longer increases. Subsequently the melt is allowed to cool. When cool it represents a dark solid mass which can easily be pulverized and directly be used for dyeing. It dissolves in water with a yellowish-olive color in a dilute sodium-sulfid or sodium-carbonate solution and in a ten-per-cent. ammonia liquid with an olive color. By a dilute soda-lye it is dissolved with a green color. On unmordanted cotton in boiling baths containing common salt and sodium sulfid intense olive shades are obtained which are fast to washing and to light. When treated with oxidizing agents, these shades become more greenish and brighter. The process proceeds in an analogous manner if instead of dimethylamidodinitrodiphenylamin other of the above-defined methylized derivatives of amidodinitrodiphenylamin are used.

Having now described my invention and in what manner the same is to be performed, what I claim as new, and desire to secure by Letters Patent, is—

1. The process for producing new dyestuffs which process consists in first mixing at about from 90° to 100° centigrade an alkaline sulfid-carrying compound with a methylized derivative of amidodinitrophenylamin of the general formula:

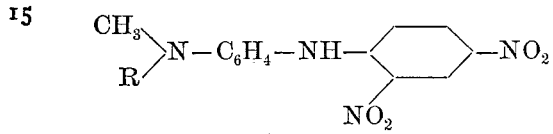

in which formula R means a hydrogen atom which may be replaced by a methylic group, and secondly heating the resulting mixture at elevated temperatures, substantially as hereinbefore described.

2. The process for producing a new dyestuff, which process consists in first mixing at about from 90° to 100° centigrade an alkaline sulfid-carrying compound with dimethylparaämidodinitrodiphenylamin of the formula:

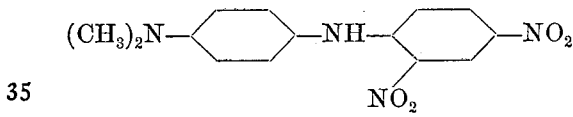

and secondly heating the resulting mixture at elevated temperatures, substantially as hereinbefore described.

3. As new articles of manufacture the new dyestuffs obtained from methylized derivatives of amidodinitrodiphenylamin of the general formula

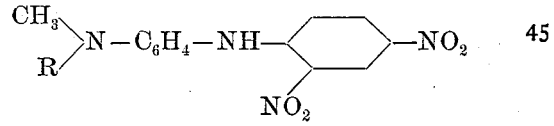

which dyestuffs are dark powders soluble in water, being dissolved by a ten-per-cent. ammonia liquor with an olive color, dyeing unmordanted cotton in hot baths containing sodium sulfid and common salt from greenish-olive, to olive and brownish-olive shades, substantially as hereinbefore described.

4. As a new article of manufacture the new dyestuff obtained from dimethylparaämidodinitrodiphenylamin of the formula

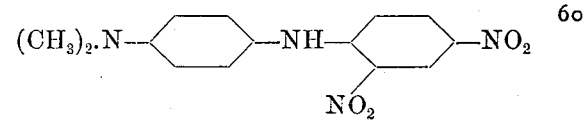

being a dark powder, soluble in water with a yellowish-olive color, in a dilute sodium-sulfid solution, a dilute sodium-carbonate solution and in a ten-per-cent. ammonia liquor with an olive color, being dissolved by a dilute soda-lye with a green color, dyeing unmordanted cotton in hot baths containing sodium sulfid and common salt intense and fast olive shades substantially as hereinbefore described.

In testimony whereof I have signed my name in the presence of two subscribing witnesses.

ERNST GOEBEL.

Witnesses:
R. E. JAHN,
OTTO KÖNIG.

It is hereby certified that in Letters Patent No. 653,670, granted July 17, 1900, upon the application of Ernst Goebel, of Elberfeld, Germany, for an improvement in "Olive Cotton-Dyes and Processes of Making Same," an error appears in the printed specification requiring correction, as follows: In line 14, page 2, the word "amidodinitrophenylamin" should read *amidodinitrodiphenylamin;* and that the said Letters Patent should be read with this correction therein that the same may conform to the record of the case in the Patent Office.

Signed, countersigned, and sealed this 7th day of August, A. D., 1900.

[SEAL.]

F. L. CAMPBELL,
*Assistant Secretary of the Interior.*

Countersigned:
  WALTER H. CHAMBERLIN,
    *Acting Commissioner of Patents.*